(12) United States Patent
Shimakawa et al.

(10) Patent No.: US 11,228,155 B2
(45) Date of Patent: Jan. 18, 2022

(54) OPTICAL FIBER AMPLIFIER

(71) Applicant: SUMITOMO ELECTRIC INDUSTRIES, LTD., Osaka (JP)

(72) Inventors: Osamu Shimakawa, Osaka (JP); Hidehisa Tazawa, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 399 days.

(21) Appl. No.: 16/437,027

(22) Filed: Jun. 11, 2019

(65) Prior Publication Data

US 2019/0379175 A1 Dec. 12, 2019

(30) Foreign Application Priority Data

Jun. 12, 2018 (JP) .............................. JP2018-111970

(51) Int. Cl.
*H01S 3/067* (2006.01)
*G02B 6/02* (2006.01)
*G02B 6/036* (2006.01)
*H04B 10/294* (2013.01)
*H01S 3/30* (2006.01)

(52) U.S. Cl.
CPC ...... *H01S 3/06754* (2013.01); *G02B 6/02042* (2013.01); *G02B 6/036* (2013.01); *H01S 3/06708* (2013.01); *H01S 3/302* (2013.01); *H04B 10/294* (2013.01); *H01S 2302/00* (2013.01)

(58) Field of Classification Search
None
See application file for complete search history.

(56) References Cited

U.S. PATENT DOCUMENTS

| 9,263,846 B2* | 2/2016 | Li ........................... H01S 3/061 |
| 2008/0018989 A1* | 1/2008 | Tanigawa ............ H01S 3/06716 359/341.3 |
| 2009/0231684 A1* | 9/2009 | Gonthier .............. G02B 6/2835 359/341.3 |

(Continued)

FOREIGN PATENT DOCUMENTS

| JP | 2014-135508 A | 7/2014 | |
| JP | 2016-189406 A | 11/2016 | |
| WO | WO-2013090549 A2 * | 6/2013 | ......... H01S 3/06754 |

*Primary Examiner* — Eric L Bolda
(74) *Attorney, Agent, or Firm* — Faegre Drinker Biddle & Reath LLP

(57) ABSTRACT

An optical fiber amplifier comprising a first optical fiber, a second optical fiber, a third optical fiber, and an excitation light source, is disclosed. Each optical fiber has cores and a cladding surrounding the cores. The third optical fiber transmits excitation light used for signal amplification in the second optical fiber. A rare-earth element is doped to the second optical fiber that amplifies an optical signal propagating therein by the excitation light. The third optical fiber includes a reduced-diameter portion. A distance between the cores of the third optical fiber in the reduced-diameter portion is shorter than a distance between the cores in other portion of the third optical fiber, and the excitation light entering from the excitation light source to one of the cores of the third optical fiber is mode-coupled with another core of the third optical fiber to distribute the excitation light in the reduced-diameter portion.

20 Claims, 5 Drawing Sheets

(56) References Cited

U.S. PATENT DOCUMENTS

| | | | |
|---|---|---|---|
| 2011/0274435 A1* | 11/2011 | Fini | H04J 14/02 |
| | | | 398/139 |
| 2014/0119694 A1* | 5/2014 | Abedin | G02B 6/262 |
| | | | 385/43 |
| 2016/0187577 A1* | 6/2016 | Sasaki | G02B 6/02042 |
| | | | 385/126 |
| 2019/0115715 A1* | 4/2019 | Hasegawa | H01S 3/06737 |

* cited by examiner

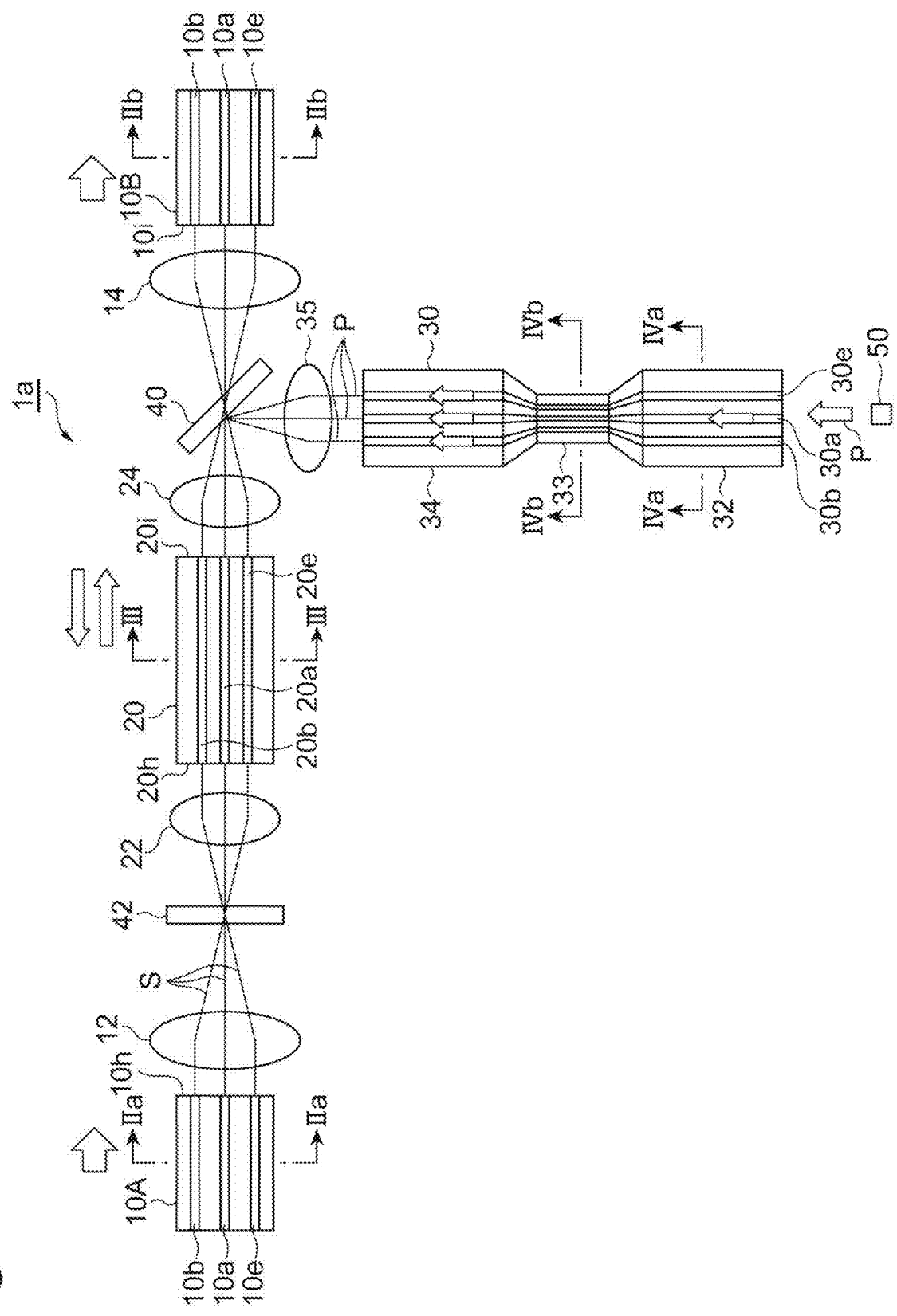

OPTICAL FIBER AMPLIFIER

CROSS REFERENCE TO RELATED APPLICATIONS

The present application is based upon and claims the benefit of the priority from Japanese patent application No. 2018-111970, filed on Jun. 12, 2018, which is hereby incorporated by reference in its entirety.

TECHNICAL FIELD

The present disclosure relates to an optical fiber amplifier.

BACKGROUND

JP2014-135508A discloses one example of a structure in which, in signal transmission using multi-core fibers (MCFs), excitation light is applied to an amplification MCF to which rare earth is doped. In this amplifier, excitation light enters a central core of the rare-earth-doped MCF, and the excitation light is distributed to outer cores which transmit respective transmission signals through mode coupling, thereby amplifying the transmission signals. Since a part of the rare-earth-doped MCF is constricted to shorten the distance between the cores, the amplifier accelerates the mode coupling to the outer cores of the excitation light entering the central core. JP2016-189406A discloses another configuration in which multi-mode excitation light enters a cladding of a rare-earth-doped MCF for amplification to collectively excite all the cores.

SUMMARY

The present disclosure provides an optical fiber amplifier. The optical fiber amplifier comprises a first optical fiber, a first lens, a second optical fiber, a pair of second lenses, a third optical fiber, a third lens, a first optical member, a second optical member, and an excitation light source. The first optical fiber has a plurality of first cores and a cladding surrounding the plurality of first cores. The first optical fiber is configured to transmit at least one optical signal. The first lens is arranged to face an outputting surface of the first optical fiber. The second optical fiber has a plurality of second cores and a cladding surrounding the plurality of second cores, in which a rare-earth element is doped to the second optical fiber. The second optical fiber is configured to amplify the optical signal propagating therein by excitation light. The pair of second lenses is respectively arranged to face entering and outputting surfaces of the second optical fiber. The third optical fiber has a plurality of third cores and a cladding surrounding the plurality of third cores. The third optical fiber is configured to transmit the excitation light used for signal amplification in the second optical fiber. The third lens is arranged to face an outputting surface of the third optical fiber. The first optical member is arranged in an optical path between the first optical fiber and the second optical fiber. The first optical member is configured to cause the optical signal outputting from the first optical fiber to enter the second optical fiber through transmission or reflection. The second optical member is arranged in an optical path between the third optical fiber and the second optical fiber. The second optical member is configured to cause the excitation light outputting from the third optical fiber to enter the second optical fiber through reflection or transmission. The excitation light source is configured to cause the excitation light to enter the third optical fiber. In the optical fiber amplifier, the first optical fiber, the first lens, the first optical member, one of the second lenses, and the second optical fiber are arranged such that the optical signal output from the first optical fiber enters the second optical fiber via the first lens, the first optical member, and one of the second lenses. The third optical fiber, the third lens, the second optical member, the one or the other of the second lenses, and the second optical fiber are arranged such that the excitation light output from the third optical fiber enters the second optical fiber via the third lens, the second optical member, and the one or the other of the second lenses. The third optical fiber includes a reduced-diameter portion, and is configured such that a distance between the third cores in the reduced-diameter portion is shorter than a distance between the third cores in other portion of the third optical fiber, and that the excitation light entering from the excitation light source to one of the third cores is mode-coupled with another core of the third cores to distribute the excitation light in the reduced-diameter portion.

BRIEF DESCRIPTION OF THE DRAWINGS

The foregoing and other purposes, aspects and advantages will be better understood from the following detailed description of a preferred embodiment of the invention with reference to the drawings, in which:

FIG. 5 is a schematic view of the structure of a fiber amplifier according to a modification.

DETAILED DESCRIPTION

Figure 1:
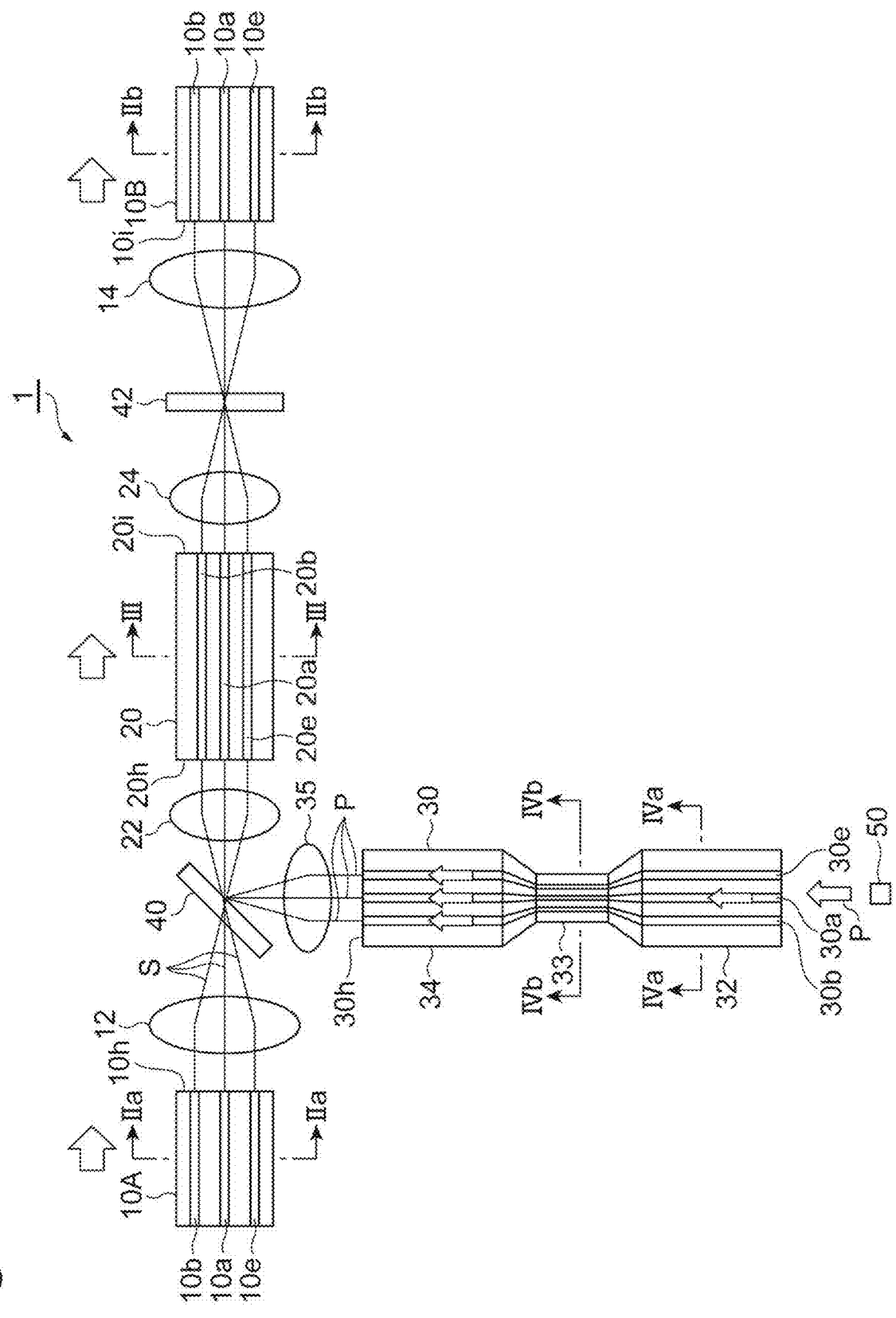
FIG. 1 is a schematic view of the structure of an optical fiber amplifier according to an embodiment.

Problem to be Solved by the Present Disclosure

In the fiber amplifier according to JP2014-135508A, a part of the rare-earth-doped MCF is constricted such that the distance between the cores is shortened, whereby the optical fiber amplifier accelerates the mode coupling to the outer cores of the excitation light entering the central core. This structure, however, can conversely mode-couples the optical signals transmitted through the outer cores of the rare-earth-doped MCF with the central core or the like. This is due to the fact that the wavelength mainly used for optical signals, 1550 nm, is of a longer wavelength than the general wavelength of excitation light, 980 nm or 1480 nm, and that inter-core crosstalk is more likely to be generated in the case of a longer wavelength. If mode coupling of excitation light is likely to be generated from the central core to the outer cores in the rare-earth-doped MCF in the above fiber amplifier, mode coupling is also generated from the outer cores to the central core with respect to the optical signals. Thus, the above optical fiber amplifier can allow the optical power of the optical signal to go away. The fiber amplifier according to JP2016-189406A adopts a structure in which the excitation light enters the cladding having a larger sectional area than the core, so that the power concentration of the excitation light is reduced, and there is the possibility of a desired amplification efficiency not being attained.

Advantageous Effect of the Present Disclosure

According to the present disclosure, it is possible to provide an optical fiber amplifier which efficiently amplifies an optical signal transmitted by an MCF.

Description of Embodiments of the Present Disclosure

Embodiments of the present disclosure will be described. A fiber amplifier according to one embodiment of the present disclosure comprises a first optical fiber, a first lens, a second optical fiber, a pair of second lenses, a third optical fiber, a third lens, a first optical member, a second optical member, and an excitation light source. The first optical fiber has a plurality of first cores and a cladding surrounding the plurality of first cores. The first optical fiber is configured to transmit at least one optical signal. The first lens is arranged to face an outputting surface of the first optical fiber. The second optical fiber has a plurality of second cores and a cladding surrounding the plurality of second cores, in which a rare-earth element is doped to the second optical fiber. The second optical fiber is configured to amplify the optical signal propagating therein by excitation light. The pair of second lenses is respectively arranged to face entering and outputting surfaces of the second optical fiber. The third optical fiber has a plurality of third cores and a cladding surrounding the plurality of third cores. The third optical fiber is configured to transmit the excitation light used for signal amplification in the second optical fiber. The third lens is arranged to face an outputting surface of the third optical fiber. The first optical member is arranged in an optical path between the first optical fiber and the second optical fiber. The first optical member is configured to cause the optical signal outputting from the first optical fiber to enter the second optical fiber through transmission or reflection. The second optical member is arranged in an optical path between the third optical fiber and the second optical fiber. The second optical member is configured to cause the excitation light outputting from the third optical fiber to enter the second optical fiber through reflection or transmission. The excitation light source is configured to cause the excitation light to enter the third optical fiber. In the optical fiber amplifier, the first optical fiber, the first lens, the first optical member, one of the second lenses, and the second optical fiber are arranged such that the optical signal output from the first optical fiber enters the second optical fiber via the first lens, the first optical member, and one of the second lenses. The third optical fiber, the third lens, the second optical member, the one or the other of the second lenses, and the second optical fiber are arranged such that the excitation light output from the third optical fiber enters the second optical fiber via the third lens, the second optical member, and the one or the other of the second lenses. The third optical fiber includes a reduced-diameter portion, and is configured such that a distance between the third cores in the reduced-diameter portion is shorter than a distance between the third cores in other portion of the third optical fiber, and that the excitation light entering from the excitation light source to one of the third cores is mode-coupled with another core of the third cores to distribute the excitation light in the reduced-diameter portion.

In the above optical fiber amplifier, the third optical fiber transmitting not an optical signal but excitation light includes a portion in which the third optical fiber is reduced in diameter (reduced-diameter portion). In the reduced-diameter portion, the distance between the third cores is shorter than the distance between the third cores in the other portion of the third optical fiber. In the optical fiber amplifier, excitation light entering from the excitation light source to one of the cores of the third optical fiber is mode-coupled with another core to distribute the excitation light. In the fiber amplifier according to this embodiment, not in the second optical fiber to which an optical signal enters and signal amplification is conducted, but in the third optical fiber transmitting excitation light, excitation light entering one of the cores is mode-coupled with another core, so that it is possible to suppress mode coupling of the optical signal transmitted through the second optical fiber. Thus, this fiber amplifier can efficiently amplify an optical signal transmitted by an MCF. Further, in this optical fiber amplifier, excitation light entering one of the cores of the third optical fiber is mode-coupled with another core, so that it is possible to decrease the number of laser diodes (LD) constituting the excitation light source to one or a small number. Further, since the excitation light is previously distributed to another core through mode coupling in the third optical fiber, it is possible to apply more uniform excitation light to the cores of the second optical fiber which receives the excitation light from the third fiber.

In an embodiment, the distances between the third cores of the third optical fiber may be equal to each other. Since the distances between the third cores are equal to each other in this embodiment, this embodiment makes optical power of the excitation light distributed to the third cores uniform when distributing the excitation light entering one core from the excitation light source to the other cores through mode coupling.

In an embodiment, the third cores of the third optical fiber may be of the same design. Since the third cores of the third optical fiber are of the same design in this embodiment, this embodiment makes optical power of the excitation light distributed to the cores uniform when distributing the excitation light entering one core from the excitation light source to the other cores through mode coupling. Here, the expression "the third cores are of the same design" means, for example, the design values of the mode field diameters (hereinafter abbreviated to "MFD") of the third cores of the third optical fiber are equal to each other.

In an embodiment, the plurality of third cores of the third optical fiber includes a central core arranged on a center axis of the third optical fiber, and the excitation light from the excitation light source may enter the central core. This embodiment can easily couple the excitation light source with the central core of the third optical fiber optically. Further, since the core to which the excitation light enters is the central core in this embodiment, the optical distribution to the outer cores located in the outer periphery thereof can be easily made uniform.

In an embodiment, the first cores of the first optical fiber, the second cores of the second optical fiber, and the third cores of the third optical fiber may be similar to each other at least in the arrangement of their outer cores arranged along the circumferential direction of each optical fiber. This embodiment can easily realize the connection between the first optical fiber and the second optical fiber, and the connection between the third optical fiber and the second optical fiber, by a spatial optical system.

In an embodiment, the first, second, and third fibers may be formed in a polygonal lattice configuration such that, when seen in a sectional view, the distances between the adjacent outer cores arranged along the circumferential direction of each optical fiber are equal to each other. This embodiment can easily make optical distribution to all the cores uniform.

In an embodiment, the first and second optical members may be formed by one wavelength division multiplexing (WDM) filter. In the optical fiber amplifier according to this embodiment, the optical signal output from the first optical fiber enters the second optical fiber through transmission or reflection by the WDM filter, and the excitation light output from the third optical fiber enters the second optical fiber through reflection or transmission by the WDM filter, whereby it is possible to form a co-propagating fiber amplifier. In this embodiment, the WDM filter may be arranged on the optical path between the first optical fiber and the second optical fiber.

In one embodiment, the second optical member may be formed by one WDM filter. In this case, it is possible to form a counter-propagating fiber amplifier. In this embodiment, the WDM filter may be arranged outside of the other lens of the second lenses.

In one embodiment, the first optical member may be configured to cause the optical signal outputting from the first optical fiber to enter the second optical fiber through transmission, and the second optical member may be configured to cause the excitation light outputting from the third optical fiber to enter the second optical fiber through reflection. In another embodiment, a second pitch between the second cores of the second optical fiber may be smaller than a first pitch between the first cores of the first optical fiber.

In one embodiment, the third optical fiber may further includes an incident portion configured to cause the excitation light to enter from the excitation light source, and outputting portion configured to output the excitation light to the second optical member. In this embodiment, the reduced-diameter portion may be arranged between the incident portion and the outputting portion. The distance between the third cores of the reduced-diameter portion may be shorter than at least one of a distance between the third cores of the incident portion and a distance between the third cores of the outputting portion.

In an embodiment, all of the first cores of the first optical fiber, all of the second cores of the second optical fiber, and all of the third cores of the third optical fiber may be located within a diameter of 0.1 mm around the center axis of each optical fiber. In another embodiment, the optical fiber amplifier may further comprises a gain equalizing filter configured to transmit the optical signal amplified by the second optical fiber, and to reflect and return the excitation light; and, a fourth optical fiber configured to transmit the amplified optical signal output from the second optical fiber via the gain equalizing filter. The gain equalizing filter may be arranged between the second optical fiber and the fourth optical fiber.

In an embodiment, the third optical fiber may be configured to output the excitation light from outer cores of the third cores that surround a center core of the third cores. In this embodiment, the excitation light output from the outer cores of the third optical fiber may enter respective corresponding outer cores of the second cores of the second optical fiber via the third lens, the second optical member, and the one or the other of the second lenses. In another embodiment, the excitation light source may be configured to cause the excitation light having a wavelength band of 0.98 μm or 1.48 μm to enter the third optical fiber.

Detailed Description of the Embodiments of the Present Disclosure

In the following, embodiments of an optical fiber amplifier according to the present disclosure will be described with reference to the drawings. In the description, the same components or components of the same function are designated by the same reference numerals, and a redundant description will be left out.

Figure 2A:
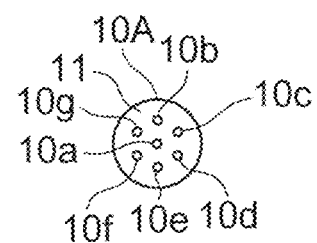
FIG. 2A is a cross-sectional view of an optical fiber 10A shown in FIG. 1 along the IIa-IIa line.
Figure 2B:
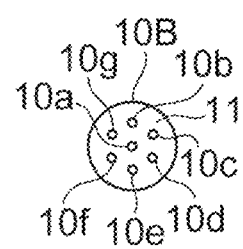
FIG. 2B is a cross-sectional view of an optical fiber 10B shown in FIG. 1 along the line.
Figure 3:
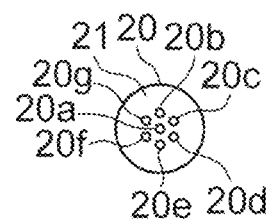
FIG. 3 is a cross-sectional view of an optical fiber 20 shown in FIG. 1 along the III-III line.
Figure 4A:
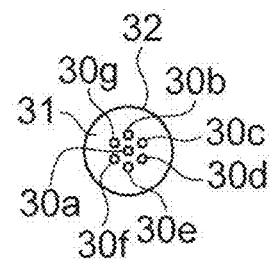
FIG. 4A is a cross-sectional view of an optical fiber 30 shown in FIG. 1 along the IVa-Iva line.
Figure 4B:
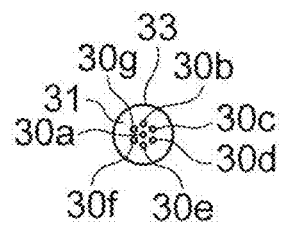
FIG. 4B is a cross-sectional view of the optical fiber 30 shown in FIG. 1 along the IVb-IVb line

FIG. 1 is a diagram schematically illustrating the structure of an optical fiber amplifier according to one embodiment. As shown in FIG. 1, an optical fiber amplifier 1 includes optical fibers 10A and 10B for signal transmission, collimating lenses 12 and 14, an optical fiber 20 for signal amplification, a pair of collimating lenses 22 and 24, an optical fiber 30 for excitation light, a collimating lens 35, a wavelength division multiplexing (WDM) filter 40, and a gain equalizing filter 42. The optical fiber amplifier 1 is used in an optical communication system in which optical signals are transmitted through multi-core fibers (MCFs). The sectional configuration of each optical fiber is shown in FIGS. 2A and 2B, FIG. 3, and FIGS. 4A and 4B. FIG. 2A is a cross-sectional view of an optical fiber 10A along the IIa-IIa line, and FIG. 2B is a cross-sectional view of an optical fiber 10B along the IIb-IIb line. FIG. 3 is a cross-sectional view of an optical fiber 20 along the III-III line. FIG. 4A is a cross-sectional view of an optical fiber 30 along the IVa-Iva line, and FIG. 4B is a cross-sectional view of the optical fiber 30 along the IVb-IVb line.

The optical fibers 10A and 10B are configured to transmit optical signals S for optical communication. Each of them has a central core $10a$, outer cores $10b$ to $10g$ arranged so as to surround the central core $10a$, and a cladding 11 surrounding the cores $10a$ to $10g$. In the optical fibers 10A and 10B, the refractive index of the cores $10a$ to $10g$ is higher than the refractive index of the cladding 11, whereby the optical signals S are transmitted through the cores $10a$ to $10g$. In the optical fibers 10A and 10B, the cores $10a$ to $10g$ are of the same design, and the cores $10a$ to $10g$ have a common mode field diameter MFD1S when the optical signals S are transmitted therethrough. Further, the cores $10a$ to $10g$ are arranged such that the core pitches P1, i.e., the inter-center distances, are equal to each other. That is, in the outer cores $10b$ to $10g$, the inter-center distances between the adjacent cores are all P1, and, in the central core $10a$, the inter-center distances between the central core $10a$ and the outer cores $10b$ to $10g$ are all P1. In the following, the word "equivalent" is used in a similar sense for the core pitches. The optical fibers 10A and 10B may not have the central core $10a$ or a part of the outer cores $10b$ to $10g$ as long as each of the optical fibers 10A and 10B has two or more cores. The optical fibers 10A and 10B may be configured not to pass the optical signal S through the central core $10a$. In this case, the core pitch P1 means the core pitch of the outer cores $10b$ through $10g$. The optical signal S transmitted through the optical fibers 10A and 10B is a beam, for example, of a wavelength band of 1.55 μm.

The collimating lens 12 is arranged to face an outputting surface $10h$ of the optical fiber 10A on the incident side of the optical signals S before amplification, and condenses the beams entering from the optical fiber 10A toward the WDM filter 40. The collimating lens 12 has a focal distance f1S when transmitting the optical signal S. The collimating lens 14 is arranged to face an incident surface $10i$ of the optical fiber 10B on the outputting side of the optical signals S after the amplification, and collimates the optical signals S amplified by the optical fiber 20 and made gain-equalizing by the filter 42 toward the optical fiber 10B. The collimating lens 14 may have the same focal distance f1S as the collimating lens 12.

In the optical fiber 20, a rare earth element such as erbium is doped to the cores 20a to 20g, and when the optical signals S from the optical fiber 10A are transmitted through it, the optical fiber 20 amplifies the optical signals S by excitation light P from the optical fiber 30. The optical fiber 20 has a central core 20a, outer cores 20b to 20g arranged so as to surround the central core 20a, and a cladding 21 surrounding the cores 20a to 20g. In the optical fiber 20, the refractive index of the cores 20a to 20g is higher than the refractive index of the cladding 21, whereby the optical signals S and the excitation light P are transmitted through the cores 20a to 20g. In the optical fiber 20, the cores 20a to 20g are of the same design, and the cores 20a to 20g have a common mode field diameter MFD2S when the optical signals S are transmitted through them, and a common mode field diameter MFD2P when the excitation light P is transmitted through them. The cores 20a to 20g are arranged such that the core pitch P2 which is the inter-center distance thereof is uniform. The excitation light P entering the optical fiber 20 may be a beam of a wavelength band of, for example, 0.98 µm or a beam of a wavelength band of, for example, 1.48 µm.

In the optical fiber 20, the arrangement of the cores 20a to 20g is similar to the arrangement of the cores 10a to 10g of the optical fibers 10A, 10B. That is, the central core 20a is arranged on the center axis of the optical fiber 20 so as to correspond to the central core 10a, and the outer cores 20b to 20g are arranged at the same arrangement angle as that of the outer cores 10b to 10g so that they may respectively correspond to the outer cores 10b through 10g. For example, the outer cores 10b to 10g and the outer cores 20b to 20g are arranged such that the angles at which the two adjacent cores and the center axis are connected to each other are equivalent to each other. On the other hand, between the optical fibers 10A and 10B and the optical fiber 20, the core pitch P1 of each of the optical fibers 10A and 10B and the core pitch P2 of the optical fiber 20 differ from each other. For example, the core pitch P2 is smaller than the core pitch P1. The optical fiber 20 may not have the central core 20a or a part of the outer cores 20b to 20g as long as the optical fiber 20 has two or more cores. The number of cores of the optical fiber 20 is not limited to the above-mentioned one but may be some other number. It is desirable for the number of cores to be in correspondence with the cores 10a to 10g (or 10b to 10g) of the optical fiber 10A, 10B.

The collimating lens 22 is arranged to face the entering surface 20h of the optical fiber 20, and collimates the optical signals S output from the optical fiber 10A and condensed at the WDM filter 40 toward the optical fiber 20. The collimating lens 24 is arranged to face the outputting surface 20i of the optical fiber 20, and condenses the beam amplified and output by the optical fiber 20 toward the filter 42. The collimating lenses 22 and 24 have a focal distance f2S when transmitting the optical signals S, and a focal distance f2P when transmitting the excitation light P.

The optical fiber 30 is configured to transmit the excitation light P used for signal amplification at the optical fiber 20. The optical fiber 30 has a central core 30a, outer cores 30b to 30g arranged so as to surround the central core 30a, and a cladding 31 surrounding the cores 30a to 30g. In the optical fiber 30, the refractive index of the cores 30a to 30g is higher than the refractive index of the cladding 31, whereby the excitation light P is transmitted through the cores 30a to 30g. In the optical fiber 30, the cores 30a to 30g are prepared by the same design, and the cores 30a to 30g have a common mode field diameter MFD3P when the excitation light P is transmitted through them. Further, the cores 30a to 30g are arranged such that their core pitch P3, which is the inter-center distance thereof, is uniform.

In the optical fiber 30, the arrangement of the cores 30a to 30g is similar to the arrangement of the cores 20a to 20g of the optical fiber 20. That is, the central core 30a is arranged on the center axis of the optical fiber 30 so as to correspond to the central core 20a, and the outer cores 30b to 30g are arranged in a hexagonal lattice configuration (a polygonal lattice configuration) and at the same arrangement angle as that of the outer cores 20b to 20g so that they may respectively correspond to the outer cores 20b to 20g. In an example, the outer cores 20b to 20g and the outer cores 30b to 30g are arranged such that the angles at which the two adjacent cores and the center axis are connected to each other are equivalent to each other. On the other hand, between the optical fiber 30 and the optical fiber 20, the core pitch P3 of the optical fiber 30 and the core pitch P2 of the optical fiber 20 differ from each other. For example, the core pitch P2 is smaller than the core pitch P3. In this way, the arrangement of the cores 20a to 20g of the optical fiber 20 is similar to both the arrangement of the cores 10a to 10g of the optical fibers 10A and 10B and the arrangement of the cores 30a to 30g of the optical fiber 30.

The optical fiber 30 has an incident portion 32, a reduced-diameter portion 33, and an outputting portion 34, subsequently in this order along the axial direction thereof. The excitation light P enters the incident portion 32. The reduced-diameter portion 33 is reduced in diameter as compared with the incident portion 32 and the outputting portion 34. The outputting portion 34 has a larger diameter than the reduced-diameter portion 33 and substantially of the same outer diameter as the incident portion 32. The outputting portion 34 emits the excitation light P toward the optical fiber 20. The distances between the cores 30a to 30g in the reduced-diameter portion 33 are shorter than the distances between the cores 30a to 30g in the incident portion 32 and/or the emission portion 34. As a result, in the optical fiber 30, when the excitation light P enters the central core 30a, for example, from the excitation light source 50, e.g., the laser diode (LD), the central core 30a is mode-coupled with the outer cores 30b to 30g in the reduced-diameter portion 33, and the excitation light P is distributed to the outer cores 30b to 30g. The inter-core distance of the cores 30a to 30g and the MFD of the cores are the same, so that the optical power of the excitation light P is uniformly distributed to all the cores 30a to 30g. The excitation light P entering from the excitation light source 50 may be applied not to the central core 30a but to one of the other outer cores 30b to 30g. In this case, the excitation light P can also be distributed to the other cores from the core to which it enters. When, however, it enters the central core 30a, it is possible to shorten the length of the reduced-diameter portion 33. The above-mentioned core pitch P3 means the pitch between the cores 30a to 30g at the outputting portion 34 (or the incident portion 32), and it is shorter than the core pitch P3 at the reduced-diameter portion 33.

The collimating lens 35 is arranged to face the outputting surface 30h of the optical fiber 30, and condenses the excitation light P entering from the outputting portion 34 of the optical fiber 30 toward the WDM filter 40. The collimating lens 35 has a focal distance f3P when transmitting the excitation light P.

The WDM filter 40 is arranged in the optical path of the optical fiber 10A and the optical fiber 20, and causes the optical signals S emitted from the optical fiber 10A to enter the optical fiber 20 through transmission. The WDM filter 40 does not transmit a beam of a wavelength other than that of the optical signals S when transmitting the optical signals S therethrough. Further, the WDM filter 40 is arranged in the optical path of the optical fiber 30 and the optical fiber 20, and causes the excitation light P emitted from the optical fiber 30 to enter the optical fiber 20 through reflection. The WDM filter 40 may be a filter which causes the optical signal S emitted from the optical fiber 10A to enter the fiber 20 through reflection, and which causes the excitation light P emitted from the optical fiber 30 to enter the optical fiber 20 through transmission.

The filter 42 is a gain equalizing filter arranged in the optical path of the optical fiber 20 and the optical fiber 10B. The filter 42 transmits the optical signals S amplified by the optical fiber 20, and reflects and returns the excitation light P, etc. used for the amplification at the optical fiber 20.

In the optical fiber amplifier 1, as a spatial optical system for the optical connection of the optical signals S, the optical fiber 10A, the collimating lens 12, the WDM filter 40, the collimating lens 22, and the optical fiber 20 are arranged such that the optical signals S output from the optical fiber 10A is condensed by the collimating lens 12, that only beams of the wavelength of the optical signals S are transmitted by the WDM filter 40, and that the transmitted optical signals S are collimated by the collimating lens 22 and enters the optical fiber 20. In addition, as another spatial optical system for the optical connection of the excitation light P, the optical fiber 30, the collimating lens 35, the WDM filter 40, the collimating lens 22, and the optical fiber 20 are arranged such that the excitation light P output from the optical fiber 30 is condensed by the collimating lens 35, that the excitation light P is reflected by the WDM filter 40, and that the reflected excitation light P is collimated by the collimating lens 22 and enters the optical fiber 20.

Here, the optical connection between the optical fiber 10A and the optical fiber 20, and the optical connection between the optical fiber 30 and the optical fiber 20 will be described in more detail with reference to FIG. 1. As shown in FIG. 1, the optical fiber 10A from which the optical signals S are output and the optical fiber 20 to which the optical signals S enter are optically connected by a spatial optical system consisting, for example, of the two collimating lenses 12 and 22. In the example shown in FIG. 1, the core pitch P1 and the mode field diameter MFD1S of the optical fiber 10A are respectively larger than the core pitch P2 and the mode field diameter MFD2S of the optical fiber 20, and the focal distance f1S of the collimating lens 12 at the optical signals S is larger than the focal distance f2S of the collimating lens 22 at the optical signals S. That is, while similar to each other in arrangement, the cores 10a to 10g of the optical fiber 10A and the cores 20a to 20g of the optical fiber 20 differ from each other in core pitch and mode field diameter. Thus, for the optical fiber 10A and the optical fiber 20 to be ideally connected (without involving any connection loss), it is necessary that the following equations (1) and (2) should be satisfied:

$$\text{Lens magnification } M12 = f2S/f1S \quad (1)$$

$$\text{Lens magnification } M12 = P2/P1 = MFD2S/MFD1S \quad (2)$$

Here, M12 means the lens magnification of the collimating lenses 12 and 22. f1S indicates the focal distance of the collimating lens 12 at the wavelength of the optical signals S, and f2S indicates the focal distance of the collimating lens 22 at the wavelength of the optical signals S. P1 is the core pitch of the optical fiber 10, and MFD1S is the mode field diameter of the cores of the optical fibers 10A and 10B at the wavelength of the optical signals S. P2 is the core pitch of the optical fiber 20, and MFD2S is the mode field diameter of the cores of the optical fiber 20 at the wavelength of the optical signals S.

Similarly, also regarding the optical connection of the optical fiber 30 and the optical fiber 20, while their arrangements are similar to each other, the cores 30a to 30g of the optical fiber 30 and the cores 20a to 20g of the optical fiber 20 differ from each other in core pitch and mod field diameter. Thus, to connect the optical fiber 30 and the optical fiber 20 ideally (without involving any connection loss), it is necessary that the following equations (3) and (4) should be satisfied:

$$\text{Lens magnification } M32(P) = f2P/f3P \quad (3)$$

$$\text{Lens magnification } M32(P) = P2/P3 = MFD2P/MFD3P \quad (4)$$

Here, M32 is the lens magnification attained by the collimating lenses 35 and 22. f2P is the focal distance of the collimating lens 22 at the wavelength of the excitation light P, and f3P is the focal distance of the collimating lens 35 at the wavelength of the excitation light P. MFD2P is the mode field diameter of the cores of the optical fiber 20 at the wavelength of the excitation light P. P3 is the core pitch at the outputting portion 34 (or the incident portion 32) of the optical fiber 30, and MFD3P is the mode field diameter of the cores at the wavelength of the excitation light P at the outputting portion 34 (or the incident portion 32) of the optical fiber 30.

Ideally, it is desirable for the optical connection of the optical fiber 10A, the optical fiber 30, and the optical fiber 20 by the spatial optical system to satisfy all of the above equations (1), (2), (3), and (4). In the present embodiment, however, in addition to what satisfy the above-mentioned relationships, there are also included optical connections in which the deviation from the ideal values of MFD1S of the optical fibers 10A and 10B and of MFD3P of the optical fiber 30 with respect to MFD2S and MFD2P of the optical fiber 20 is ±25% or less, respectively. More preferably, there are included optical connections in which the deviation from MFD1S of the optical fibers 10A and 10B and MFD3P of the optical fiber 30 with respect to MFD2S and MFD2P of the optical fiber 20 is ±25% or less. This is due to the fact that, in a deviation within this range, the connection loss when the optical fibers such as MCFs are connected each other is within a permissible range.

More specifically, the optical fiber amplifier 1 is formed in such a way as to satisfy the following conditions (1) through (4):

[Optical Connection between the Fiber 10A and the Fiber 20]

Condition (1): Each of the MFD1S of the cores 10a to 10g of the optical fiber 10A at the optical signals S is a value which is within ±25% of MFD2S×(P1/P2) of the corresponding cores 20a to 20g of the optical fiber 20 at the optical signals S.

Condition (2): Each of the MFD1S of the cores 10a to 10g of the optical fiber 10A at the optical signals S is a value which is within ±25% of MFD2S×(f1S/f2S) of the corresponding cores 20a to 20g of the optical fiber 20 at the optical signals S.

[Optical Connection Between the Fiber 30 and the Fiber 20]

Condition (3): Each of the MFD3P of the cores 30a to 30g of the optical fiber 30 at the excitation light P is a value which is within ±25% of MFD2P×(P3/P2) of the corresponding cores 20a to 20g of the optical fiber 20 at the excitation light P.

Condition (4): Each of the MFD3P of the cores 30a to 30g of the optical fiber 30 at the excitation light P is a value which is within ±25% of MFD2P×(f3P/f2P) of the corresponding cores 20a to 20g of the optical fiber 20 at the excitation light P.

The optical connection between the optical fiber 20 and the optical fiber 10B is similar to that in the case of the optical connection between the optical fiber 10A and the optical fiber 20.

In this way, in the optical fiber amplifier 1, the optical fibers 10A and 10B transmitting the optical signals S and the optical fiber 20 amplifying the optical signals S are optically connected by the spatial optical system consisting of the collimating lenses 12 and 22, the WDM filter 40, etc. Further, the arrangement of the cores 10a to 10g of the optical fibers 10A and 10B and the arrangement of the cores 20a to 20g of the optical fiber 20 are similar to each other. Each of the MFD1S of the cores 10a to 10g of the optical fibers 10A and 10B is a value which is within ±25% of MFD2S×(P1/P2) of the corresponding cores 20a to 20g of the optical fiber 20, and is a value which is within ±25% of MFD2S×(f1S/f2S) of the corresponding cores 20a to 20g of the optical fiber 20. In this structure, even when the optical fibers 10A and 10B transmitting the optical signals S are MCFs, it is possible to suitably effect optical connection between the cores of the optical fibers 10A, 10B and the cores of the optical fiber 20, making it possible to reduce the connection loss at the time of optical amplification between the fibers. That is, in an optical amplifier for MCF, it is possible to enhance the optical connection efficiency even between fibers differing from each other in MFD. Further, the optical fibers 10A, 10B and the optical fiber 20 are connected to each other by a spatial optical system, it is possible to collectively connect a plurality of cores, making it possible to achieve simplification in structure and operation.

In the optical fiber amplifier 1, the arrangement of the cores 30a to 30g at the outputting portion 34 of the optical fiber 30 and the arrangement of the cores 20a to 20g of the optical fiber 20 are similar to each other. Each of the MFD3P of the cores 30a to 30g at the outputting portion 34 of the optical fiber 30 is a value which is within ±25% of MFD2P× (P3/P2) of the corresponding cores 20a to 20g of the optical fiber 20, and is a value which is within ±25% of MFD2P× (f3P/f2P) of the corresponding cores 20a to 20g of the optical fiber 20. In this structure, even when the optical fiber 30 transmitting the excitation light P is a MCF, it is possible to suitably effect optical connection between the cores of the optical fibers 20 and 30, making it possible to reduce the connection loss at the time of optical amplification between the fibers. That is, in an optical amplifier for MCF, it is possible to enhance the optical connection efficiency even between the fibers 20 and 30 differing from each other in MFD. Further, the fibers 20 and 30 are connected to each other by a spatial optical system, it is possible to collectively connect a plurality of cores, making it possible to achieve simplification in structure and operation.

In the optical fiber amplifier 1 according to the present embodiment, the optical fiber 30 transmitting not the optical signals S but the excitation light P includes the reduced-diameter portion 33, and the distance between the cores 30a to 30g at the reduced-diameter portion 33 is shorter than the inter-core distance at the incident portion 32 and the outputting portion 34. The excitation light P entering from the excitation light source 50 to the central core 30a of the optical fiber 30 is mode-coupled with the outer cores 30b to 30g to distribute the excitation light P. In this embodiment, not in the optical fiber 20 to which the optical signals S enters and in which signal amplification is effected but in the optical fiber 30 transmitting the excitation light P, the excitation light P entering the central core 30a is mode-coupled with the outer cores 30b to 30g, so that it is possible to suppress the mode coupling in the optical signals S transmitted through the optical fiber 20. As a result, in the optical fiber amplifier 1, it is possible to efficiently amplify the optical signals S transmitted by the MCF. Further, since the excitation light P entering the central core 30a of the optical fiber 30 is mode-coupled with the outer cores 30b to 30g in the optical fiber amplifier 1, it is possible to suppress the number of laser diodes (LD) serving as the excitation light source 50 to one. Further, since the excitation light P is previously distributed to the other cores through mode coupling in the optical fiber 30, it is possible to apply a more uniform excitation beam to the cores 20a to 20g of the optical fiber 20.

In the optical fiber amplifier 1, the distances between the cores 30a to 30g of the optical fiber 30 are equal to each other. Thus, when distributing the excitation light P entering one core from the excitation light source 50 to the other cores through mode coupling, the optical power of the excitation light P distributed to the cores can be made uniform.

In the optical fiber amplifier 1, the cores 30a to 30g of the optical fiber 30 are of the same design. Thus, when distributing the excitation light P entering the central core 30a from the excitation light source 50 to the outer cores 30b to 30g through mode coupling, the optical power of the excitation light P distributed to the cores can be made uniform.

In the optical fiber amplifier 1, the excitation light from the excitation light source 50 enters the central core 30a. In this case, it is possible to easily effect the optical connection between the excitation light source 50 and the central core 30a of the fiber 30. Further, since the core to which the excitation light P enters is the central core 30a, the optical distribution to the outer cores 30b to 30g situated in the outer circumference thereof can be easily made uniform.

In the optical fiber amplifier 1, the cores 10a to 10g of the optical fibers 10A and 10B, the cores 20a to 20g of the optical fiber 20, and the cores 30a to 30g of the optical fiber 30 are similar to each other at least in the arrangement of the outer cores along the circumferential direction. Thus, the connection between the optical fibers 10A, 10B and the optical fiber 20, and the connection between the optical fiber 30 and the optical fiber 20 can be easily realized by the spatial connection system.

In the optical fiber amplifier 1, the optical fibers 10A, 10B, 20, and 30 are formed in a polygonal lattice configuration such that, when seen in a sectional view, the distances between the adjacent outer cores arranged along the circumferential direction are equal to each other. In this respect also, the optical fiber amplifier 1 can easily realize uniformity in the optical distribution to all the cores.

In the optical fiber amplifier 1, all of the cores 10a to 10g, all of the cores 20a to 20g, and all of the cores 30a to 30g of the optical fibers 10A, 10B, 20, and 30 may be located within a diameter of 0.1 mm around the center axis of each optical fiber. This suppresses deterioration in optical connection efficiency which would result when the offset of the beams emitted from the optical fibers 10A, 30, etc. in the optical path is large, such that axial deviation occurs when effecting the optical connection to the optical fiber 20.

Preferably, the outer cores of the optical fibers 10A, 10B, 20, and 30 are all arranged within a diameter of 0.1 mm around the center axis of each optical fiber, whereby it is possible to reduce the offset of the optical path and to mitigate the influence thereof. In this structure, it is possible to suppress the offset of the optical path generated, for example, when a beam such as the optical signal S is transmitted through the WDM filter 40, whereby it is possible to suppress a reduction in optical connection efficiency generated as the optical path is offset. This also applies to the filter 42.

In the optical fiber amplifier 1, the outer cores 20b to 20g of the optical fiber 20 may be arranged closer to the center axis than the outer cores 10b to 10g of the optical fibers 10A and 10B. The MFD of the optical fiber 20 for amplification is often made smaller than the MFD of the other optical fibers, and is subject to the influence of axial deviation due to rotational angle deviation. By arranging it closer to the center as in the present structure, it is possible to relatively reduce the axial deviation amount due to the rotational angle deviation. As a result, it is possible to further reduce the connection loss at the optical fiber 20.

The optical fiber amplifier according to the present embodiment has been described above, but the present invention is not limited to the embodiment and allows application of various modifications. For example, while the above-described embodiment is applied to the forward pumping type fiber amplifier 1, it is also applicable to a backward pumping type fiber amplifier 1a as shown in FIG. 5. As shown in FIG. 5, in the backward pumping type fiber amplifier 1a, on the optical signals S incident (end surface 20h) side of the optical fiber 20 for amplification, the optical fiber 10A is optically connected via the filter 42, which is a gain equalizing filter, and the optical fiber 30 for the excitation light is not optically connected to the optical fiber 20. On the other hand, on the optical signals S outputting (end surface 20i) side of the optical fiber 20, the optical fiber 30 is optically connected to the optical fiber 20 via the WDM filter 40. The excitation light P enters from the end surface 20i of the optical fiber 20 via the WDM filter 40, and the optical signals S are amplified by this excitation light P. Regarding the amplification method in the backward pumping type fiber amplifier 1a, it is obvious to those skilled in the art, and a detailed description thereof will be left out. As in the case of the fiber amplifier 1, so long as the above equations (1) through (4) and the above conditions (1) through (4) are satisfied, it is possible to reduce the connection loss accompanying MCF connection. Also in this modification, the optical fiber 30 is provided with the reduced-diameter portion 33, and the excitation light P entering the central core 30a is suitably distributed to the outer cores 30b to 30g at the reduced-diameter portion 33. After this, the excitation light P enters the cores 20a to 20g of the optical fiber 20.

It should be understood that the embodiments disclosed herein are illustrative and non-restrictive in every respect. The scope of the present invention is shown, not in the above sense, but by the appended claims, and it is intended that all alterations in a sense and scope equivalent to those of the claims should be included.

What is claimed is:

1. An optical fiber amplifier comprising:
a first optical fiber having a plurality of first cores and a cladding surrounding the plurality of first cores, the first optical fiber being configured to transmit at least one optical signal;
a first lens arranged to face an outputting surface of the first optical fiber;
a second optical fiber having a plurality of second cores and a cladding surrounding the plurality of second cores, wherein a rare-earth element is doped to the second optical fiber, the second optical fiber being configured to amplify the optical signal propagating therein by excitation light;
a pair of second lenses respectively arranged to face entering and outputting surfaces of the second optical fiber;
a third optical fiber having a plurality of third cores and a cladding surrounding the plurality of third cores, the third optical fiber being configured to transmit the excitation light used for signal amplification in the second optical fiber;
a third lens arranged to face an outputting surface of the third optical fiber;
a first optical member arranged in an optical path between the first optical fiber and the second optical fiber, the first optical member being configured to cause the optical signal outputting from the first optical fiber to enter the second optical fiber through transmission or reflection;
a second optical member arranged in an optical path between the third optical fiber and the second optical fiber, the second optical member being configured to cause the excitation light outputting from the third optical fiber to enter the second optical fiber through reflection or transmission; and
an excitation light source configured to cause the excitation light to enter the third optical fiber,
wherein the first optical fiber, the first lens, the first optical member, one of the second lenses, and the second optical fiber are arranged such that the optical signal output from the first optical fiber enters the second optical fiber via the first lens, the first optical member, and one of the second lenses, and
the third optical fiber, the third lens, the second optical member, the one or the other of the second lenses, and the second optical fiber are arranged such that the excitation light output from the third optical fiber enters the second optical fiber via the third lens, the second optical member, and the one or the other of the second lenses, and
wherein the third optical fiber includes a reduced-diameter portion, and is configured such that a distance between the third cores in the reduced-diameter portion is shorter than a distance between the third cores in other portion of the third optical fiber, and that the excitation light entering from the excitation light source to one of the third cores is mode-coupled with another core of the third cores to distribute the excitation light in the reduced-diameter portion.

2. The optical fiber amplifier according to claim 1, wherein distances between the third cores of the third optical fiber are equal to each other.

3. The optical fiber amplifier according to claim 1, wherein the third cores of the third optical fiber are of the same design.

4. The optical fiber amplifier according to claim 1, wherein the plurality of third cores of the third optical fiber includes a central core arranged on a center axis of the third optical fiber, wherein the excitation light from the excitation light source enters the central core.

5. The optical fiber amplifier according to claim 1, wherein the first cores of the first optical fiber, the second cores of the second optical fiber, and the third cores of the third optical fiber are similar to each other at least in the arrangement of their outer cores arranged along the circumferential direction of each optical fiber.

6. The optical fiber amplifier according to claim 1, wherein the first, second, and third fibers are formed in a polygonal lattice configuration such that, when seen in a sectional view, the distances between the adjacent outer cores arranged along the circumferential direction of each optical fiber are equal to each other.

7. The optical fiber amplifier according to claim 1, wherein the first and second optical members are formed by one wavelength division multiplexing filter.

8. The optical fiber amplifier according to claim 7, wherein the wavelength division multiplexing filter is arranged on the optical path between the first optical fiber and the second optical fiber.

9. The optical fiber amplifier according to claim 1, wherein the second optical member is formed by one wavelength division multiplexing filter.

10. The optical fiber amplifier according to claim 9, wherein the wavelength division multiplexing filter is arranged outside of the other lens of the second lenses.

11. The optical fiber amplifier according to claim 1, wherein the first optical member is configured to cause the optical signal outputting from the first optical fiber to enter the second optical fiber through transmission, and the second optical member is configured to cause the excitation light outputting from the third optical fiber to enter the second optical fiber through reflection.

12. The optical fiber amplifier according to claim 1, wherein a second pitch between the second cores of the second optical fiber is smaller than a first pitch between the first cores of the first optical fiber.

13. The optical fiber amplifier according to claim 1, wherein the third optical fiber further includes an incident portion configured to cause the excitation light to enter from the excitation light source, and outputting portion configured to output the excitation light to the second optical member.

14. The optical fiber amplifier according to claim 13, wherein the reduced-diameter portion is arranged between the incident portion and the outputting portion.

15. The optical fiber amplifier according to claim 13, wherein the distance between the third cores of the reduced-diameter portion is shorter than at least one of a distance between the third cores of the incident portion and a distance between the third cores of the outputting portion.

16. The optical fiber amplifier according to claim 1, wherein all of the first cores of the first optical fiber, all of the second cores of the second optical fiber, and all of the third cores of the third optical fiber are located within a diameter of 0.1 mm around the center axis of each optical fiber.

17. The optical fiber amplifier according to claim 1, further comprising:
a gain equalizing filter configured to transmit the optical signal amplified by the second optical fiber, and to reflect and return the excitation light; and
a fourth optical fiber configured to transmit the amplified optical signal output from the second optical fiber via the gain equalizing filter,
wherein the gain equalizing filter is arranged between the second optical fiber and the fourth optical fiber.

18. The optical fiber amplifier according to claim 1, wherein the third optical fiber is configured to output the excitation light from outer cores of the third cores that surround a center core of the third cores.

19. The optical fiber amplifier according to claim 18, wherein the excitation light output from the outer cores of the third optical fiber enters respective corresponding outer cores of the second cores of the second optical fiber via the third lens, the second optical member, and the one or the other of the second lenses.

20. The optical fiber amplifier according to claim 1, wherein the excitation light source configured to cause the excitation light having a wavelength band of 0.98 μm or 1.48 μm to enter the third optical fiber.

* * * * *